United States Patent
Zenine et al.

(10) Patent No.: US 11,799,746 B2
(45) Date of Patent: Oct. 24, 2023

(54) METHOD FOR NEAR-REAL-TIME COMMUNICATING NEGATIVE USER EXPERIENCE OF USERS INTERACTING WITH A WEBSITE

(71) Applicant: Content Square SAS, Paris (FR)

(72) Inventors: Ryad Zenine, Paris (FR); Vincent Colombet, Paris (FR)

(73) Assignee: Content Square SAS, Paris (FR)

(*) Notice: Subject to any disclaimer, the term of this patent is extended or adjusted under 35 U.S.C. 154(b) by 0 days.

(21) Appl. No.: 16/937,938

(22) Filed: Jul. 24, 2020

(65) Prior Publication Data
US 2022/0029904 A1    Jan. 27, 2022

(51) Int. Cl.
*H04L 43/0876* (2022.01)
*G06F 8/65* (2018.01)
*H04L 67/00* (2022.01)

(52) U.S. Cl.
CPC ............ *H04L 43/0876* (2013.01); *G06F 8/65* (2013.01); *H04L 67/34* (2013.01)

(58) Field of Classification Search
CPC ....... G06F 8/65; H04L 43/08; H04L 43/0876; H04L 67/34
See application file for complete search history.

(56) References Cited

U.S. PATENT DOCUMENTS

| | | | | |
|---|---|---|---|---|
| 10,389,574 B1* | 8/2019 | Wu | ................... | H04L 41/40 |
| 2009/0235236 A1* | 9/2009 | Nickerson | .............. | G06Q 10/00 |
| | | | | 717/128 |
| 2011/0078602 A1* | 3/2011 | Gammon | ............ | G06F 16/2465 |
| | | | | 709/227 |
| 2013/0104030 A1 | 4/2013 | Parreira | | |
| 2014/0344217 A1 | 11/2014 | Title et al. | | |
| 2018/0039530 A1* | 2/2018 | Ciabarra, Jr. | ....... | G06F 11/3006 |
| 2018/0307661 A1* | 10/2018 | McDuff | .............. | G06F 16/9577 |
| 2019/0102469 A1* | 4/2019 | Makovsky | .......... | G06F 11/0781 |
| 2019/0260818 A1 | 8/2019 | Ciabarra, Jr. | | |

OTHER PUBLICATIONS

International Search Report and Written Opinion of International Searching Authority for PCT/IB2020/057036, ISA/EPO, Rijswijk, Netherlands, dated: Dec. 18, 2020.

* cited by examiner

*Primary Examiner* — S. Sough
*Assistant Examiner* — Cheneca Smith
(74) *Attorney, Agent, or Firm* — Schwegman Lundberg & Woessner, P.A.

(57) ABSTRACT

A system and method for near-real-time communicating negative user experience of users interacting with a website are provided. The method includes identifying at least one interaction pattern by analyzing an in-page interaction information of a user interacting with at least one page of the website; computing a user experience score for each of the at least one identified interaction pattern; generating an alert indicating that the user experience score determined for a respective identified interaction pattern demonstrates a negative user experience; and sending the alert immediately upon identifying the interaction pattern demonstrating a negative user experience.

20 Claims, 6 Drawing Sheets

METHOD FOR NEAR-REAL-TIME COMMUNICATING NEGATIVE USER EXPERIENCE OF USERS INTERACTING WITH A WEBSITE

TECHNICAL FIELD

The disclosure generally relates to tracking visitors of a website and, more specifically, to a system and method for near real-time communication of user behavior on a website.

BACKGROUND

With the ubiquitous nature of the Internet, having a successful presence on the web has become an indispensable tool for modern businesses and organizations. The commercial value of a website cannot be understated, as it provides perhaps the most easily-accessible portal through which current and potential clients can interact with a company, both through passive viewing, as well as active engagement, such as the purchasing of products and services and initiating contact with the company.

Website visitors usually make their way through the website until either the user performs a desired action, such as an online purchase, or the user leaves the website without performing such an action. Performing a desired action is referred to as a "conversion," and the goal of many websites owners and operators is to maximize the number of conversions from the visitors of their website.

In order to increase conversion rates, website owners often edit, modify, or change variables related to their websites in order to optimize a user's experience within the website.

Some known solutions introduce ways to track and monitor users' journeys within websites and thereafter recommend the next optimal action based on detected events in order to provide an enhanced user experience. Other known solutions allow for automatic determination of the best experience for a given visitor based on the user's profile. Another solution enables creation of custom segments in the website based on rules (e.g., searched term, articles viewed, items that were added to cart, etc.) to trigger content personalization on a certain webpage.

The abovementioned solutions fail to communicate in real-time or near-real-time to the website owner enriched and actionable information regarding the user's behavior on a website. As such, websites cannot be properly modified or optimized to enhance the user experience in real-time or near real-time.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for near-real-time communicating negative user experience of users interacting with a website. The method comprises identifying at least one interaction pattern by analyzing an in-page interaction information of a user interacting with at least one page of the website; computing a user experience score for each of the at least one identified interaction pattern; generating an alert indicating that the user experience score determined for a respective identified interaction pattern demonstrates a negative user experience; and sending the alert immediately upon identifying the interaction pattern demonstrating a negative user experience.

Certain embodiments disclosed herein also include a non-transitory computer readable medium having stored thereon instructions for causing a processing circuitry to execute a process, the process comprising: identifying at least one interaction pattern by analyzing an in-page interaction information of a user interacting with at least one page of the website; computing a user experience score for each of the at least one identified interaction pattern; generating an alert indicating that the user experience score determined for a respective identified interaction pattern demonstrates a negative user experience; and sending the alert immediately upon identifying the interaction pattern demonstrating a negative user experience.

In addition, certain embodiments disclosed herein include a system for near-real-time communicating negative user experience of users interacting with a website. The system comprises a processing circuitry; and a memory, the memory containing instructions that, when executed by the processing circuitry, configure the system to: identify at least one interaction pattern by analyzing an in-page interaction information of a user interacting with at least one page of the website; compute a user experience score for each of the at least one identified interaction pattern; generate an alert indicating that the user experience score determined for a respective identified interaction pattern demonstrates a negative user experience; and send the alert immediately upon identifying the interaction pattern demonstrating a negative user experience.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings, in which:

DETAILED DESCRIPTION

Figure 1:
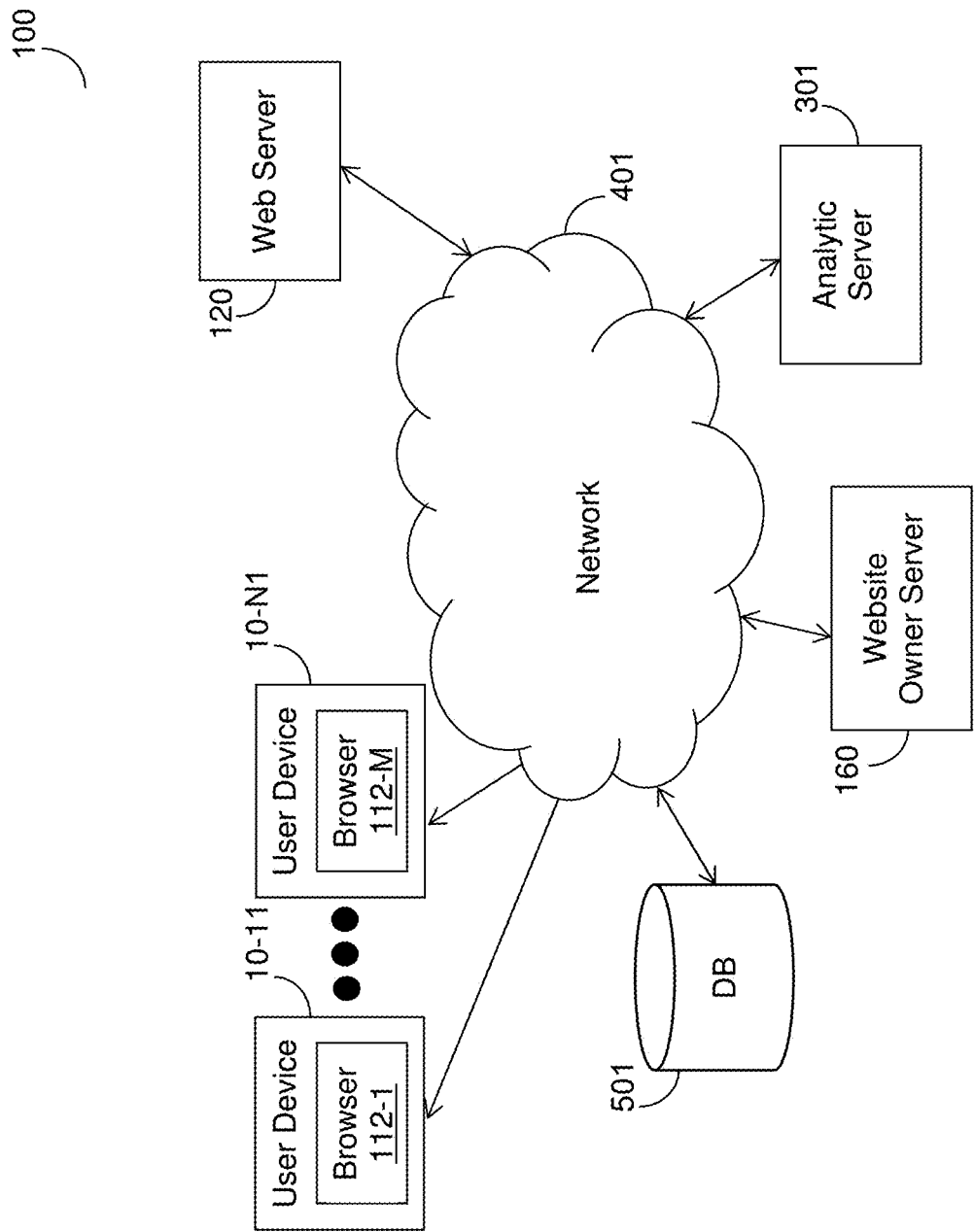
FIG. 1 shows a network diagram utilized to describe the various embodiments of the invention.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example diagram of a network system 100 utilized to describe the various embodiments. The network system 100 includes one or more user devices, 110-1 through 110-N (hereinafter, "user device" 110 or "user devices" 110), at least one web server 120, and an analytic sever 130, all connected to a network 140. The analytic sever 130 may be adapted to gather, process, and analyze interaction information (e.g. user activity information) related to the engagement of users of user devices 110 interacting with a website hosted by the web server 120. The interaction information may be received from one or more user devices 110. In an example embodiment, such websites include an e-commerce website, i.e., any website that offers goods, services, or both.

The network 140 provides interconnectivity between the various components of the system. The network 140 may be, but is not limited to, a wireless, cellular or wired network, a local area network (LAN), a wide area network (WAN), a metro area network (MAN), the Internet, the worldwide web (WWW), similar networks, and any combination thereof. The network 140 may be a full-physical network, including exclusively physical hardware, a fully-virtual network, including only simulated or otherwise virtualized components, or a hybrid physical-virtual network, including both physical and virtualized components. Further, the network 140 may be configured to encrypt data, both at rest and in motion, and to transmit encrypted, unencrypted, or partially-encrypted data. The network 140 may be configured to connect with the various components of the system 100 via any combination of wired and wireless means.

A user device 110 may be any computing device allowing a user to at least download webpages (or simply "pages"), display webpages, and interact with webpages. A user device 110 may be, but is not limited to, a smart phone, a tablet computer, a personal computer, a laptop computer, a netbook computer, an electronic reader, and the like. A user device may be installed with a web browser 112, such as Safari®, Firefox®, Internet Explorer®, Chrome®, and the like. A processor of the user device 110 runs an operating system that may include iOS®, Android®, Unix®, Windows®, and the like. It should be noted that the browser 112 may include any mobile application executable over the user device 110, an extension of the browser 112, or both. Such an application is typically downloaded from a central repository (not shown) which may be, as examples and without limitation, AppStore® by Apple Computers®, Google® Play®, and the like.

The web server 120 can host at least one website accessed through a browser 112. The website may be, for example, an e-commerce website, an online retail platform, a social media platform, and the like. In an embodiment, the web server 120 is further configured to execute an application, such as a web application, a mobile application (app), a cloud application, and the like. The information rendered by such applications is displayed over the browser 112.

The disclosed embodiments allow for detection of, in real-time, interaction patterns of users (e.g., visitors) of both websites and applications, and improvement of user experience by providing near real-time notifications related to the detected interaction patterns.

The various disclosed embodiments may also be utilized to generate other analytics data that is based on the user's journey through Hypertext Markup Language (HTML) scripts of either the web pages of a website displayed over a browser (e.g., the browser 112) or the content displayed over a mobile application. Without limiting the scope of the disclosed embodiment and merely for the sake of simplicity, the description hereinbelow will be made with reference to the browser 112. It should be further noted that the disclosed teachings are not limited for scripts retrieved from one server. The browser 112 can render display content retrieved from a plurality of servers, including web servers, application servers, or both.

Any webpage visited by a user device 110 and provided by the web server 120 includes a tracking tag. The tracking tag, when interpreted by a browser 112, executes a piece of code (e.g., a script) configured to track an interaction of a user with the web page. This includes a URL visited, any element in the page clicked by, or hovered over by, the user, the time spent on a certain web page, and the like.

The analytic sever 130, depicted in detail with respect to FIG. 6, below, is a system configured to execute instructions, organize information, and otherwise process data. The analytic sever 130 may be configured to execute the methods described hereinbelow, other, like, methods, and any combination thereof. As described with respect to FIG. 6, below, the analytic sever 130 may include various processing, memory, networking, and other components allowing the analytic sever 130 to execute instructions and provide data processing. The analytic sever 130 may be implemented as physical hardware, as software virtualizing physical hardware, or as a combination of physical and virtualized components.

According to the disclosed embodiment, the analytic sever 130 is configured to receive browsing activity from any user device (e.g., the user device 110). In an embodiment, the browsing activity includes interaction information of the user with any tracked webpage of the website. The interaction information of the browsing activity may include a mouse movement, scrolling of a web page, resizing of a browser window, click events, keyboard use with any element of a webpage, and the like. The interaction information may further include URL, referrer, load time, IP address, browser type, screen resolution, page views, and the like.

In an embodiment, the analytic sever 130 is configured to extract one or more predetermined interaction events from the interaction information gathered. An interaction event may be, for example, a hover with the mouse cursor over an element (e.g., a virtual button, a link), a click on an element, a tap on an element (e.g., tapping on a specific virtual button), and the like. It should be noted that additional interaction events may be previously elected and, therefore, extracted from the received interaction information without departing from the scope of the disclosed embodiments.

In an embodiment, the analytic sever 130 is configured to select (e.g., from a database) a corresponding website configuration (e.g., of several webpages) in which the user is currently browsing. The website configuration may indicate different zones of each web page of the website, and uniform resource locators (URLs) of each webpage of the website. In an embodiment, the website configuration can be included in a file, a data structure, and the like. In an embodiment, the zones in the webpages can be identified using a process discussed in greater detail in U.S. patent application Ser. No.

16/915,190, herein after the '190 Application, assigned to the common assignee and hereby incorporated by reference. In an embodiment, the analytic sever 130 is configured to detect the zones in a webpage and not retrieve such information.

In an embodiment, the analytic sever 130 is configured to apply a designated algorithm, such as a zone attribution algorithm, to the interaction information, the interaction events and the configuration file of the website. The output of the zone attribution algorithm allows for determination, with respect to each detected interaction event, a webpage (i.e., a URL) in which the event occurred and a zone in the web page in which the event occurred. In an embodiment, the determination may be performed in near-real-time.

For example, interaction information of browsing activity of a user device (e.g. the user device 110) that browses through a certain website is received at the server 130. According to the same example, the interaction information includes, among other features, an interaction event indicating that the user, interacting with the user device, has just clicked six times on the same button (e.g., "10" shoe size button) within five seconds. According to the same example, the interaction information, when analyzed by the analytic sever 130, allows for enrichment of the interaction information and, therefore, facilitates determination of the specific webpage in which the interaction event occurred and the zone (e.g., "select size" zone) in which the interaction event occurred. It should be noted that the analysis may include selecting, based on the interaction information, the corresponding website configuration in which the user is currently browsing. By selecting the corresponding website configuration, the analytic sever 130 may be configured to determine in which page(s) and zone(s) the interaction event has occurred.

In an embodiment, the analytic sever 130 may be configured to generate a user experience score representing the user interaction pattern, while browsing through a certain website. The user experience score is computed in real-time based on the user interaction pattern and user experience factor. Such interaction patterns may be determined based on one or more interaction events that occur while the user browses through the website. It should be noted that the user experience score may be constantly updated.

User experience factors are predefined interactions which indicate a user's difficulty or ease in operating or navigating a webpage or site. The factors may be indicative of a negative or positive interaction of a user with a website. In an example, the website may be an e-commerce website, and user experience factors may include data reflecting or describing one or more events which distract the user or otherwise hinder the user from reaching one or more predefined objectives or goals. User experience factors may include, without limitation, multiple-field and multiple-button interactions, which may be identified where a user clicks a given field or button more than a predefined number of times, and rage clicks, which may be identified where a user clicks a given element more than a predefined number of times in a period shorter than a predefined time threshold.

In addition, user experience factors may include, without limitation, loading times, which may be identified where a page takes longer than a predetermined time threshold to load, "disappointment clicks," which may be identified where a user's click on a first page loads a second page, and where the user returns to the first page in a time below a predetermined time threshold, and multiple page visits, which may be identified where a user returns to the same page multiple times during a session. Further, user experience factors may include additional factors like those described above, as well as any combination of those factors described above and the various, like, factors.

The user experience score may be for example, a number such as 1.0, 2.7, 4.0, 7.3, etc. A low number (e.g., 1.0) may represent a positive user experience while a high number (e.g., 7.3) may represent a negative user experience when interacting with a website.

For example, a user browses through a retail website and, in the home page one click is made, allowing the user to navigate directly to the "women" section. In this case, the user experience score may be relatively low (e.g., 1). According to the same example, after the "women" web page is downloaded and displayed, the interaction information indicates that the user is hovering with the mouse cursor over the "women" menu, which includes eight subsections, for more than 25 seconds. According to the same example, the relatively long hover may indicate an interaction event that may increase the user experience score (e.g., to 4.3). According to the same example, after the long hover, the user clicks more than four times on the same button in the "women" menu, but the button does not respond. According to the same example, the user experience score may be updated accordingly and, therefore, may represent a new and higher, than the previous score, user experience score of 8.0. It should be noted that the user experience score may be computed based on several metrics such as the interaction event type, the interaction event zone, the web page in which the event occurred, and the like.

According to one embodiment, upon determination that the user experience score is above a predetermined threshold value, the analytic sever 130 may be configured to generate and send an alert (in near real-time) to a website owner server 160 that is associated with the website in which the user browses. The alert may indicate the URL of the web page or web pages in which interaction event (or events) occurred, the zone or zones in which the interaction event (or events) occurred, the interaction event type, a time pointer at which each interaction event occurred, and so on. It should be noted that upon receiving the alert the website owner server 160 may execute one or more actions. For example, and without limitation, an action may include sending, by the website owner server 160, an electronic message for display on the web browser 112. Such an electronic message may include a suggestion to assist the user with the specific problem the user has encountered.

According to another embodiment, upon determination that the user experience score crosses a predetermined threshold value, the analytic sever 130 may send the alert (e.g., one or more code lines) to the browser 112. Then, upon receiving the alert, a predetermined action may be automatically executed by the user device 110. That is, one or more predetermined code lines, such as those designed by the website owner, may be used for solving one or more possible problems. For example, the alert may indicate that the "add to cart" button does not respond after two attempts. According to the same example, a predetermined code line may address this specific problem by automatically generating and displaying an electronic message on the browser 112 inviting the user to input the product code in order to overcome the technical problem.

According to one embodiment, the analytic sever 130 may be configured to adjust and prioritize the alerts based on, for example, data that was gathered with respect to the user. Such data may include for example, the interaction information of the user when interacting with one or more webpages and historical data of the user. The interaction information may indicate, for example, the current status of the electronic shopping cart, the number of pages the user has visited, and so on. The historical data of the user may include, for example, the historical purchases made by the user, average amounts spent on each visit, and so on. The historical data may be extracted from, for example, a database (e.g., the database 150). The analytic sever 130 may be configured to analyze the data that was gathered with respect to the user (e.g., the interaction information of the user when interacting with one or more webpages and historical data of the user) in order to adjust and prioritize the alerts based.

As an example, when the user experience score crosses a predetermined threshold value after the user was unable to add the tenth item (while nine items were easily added), an alert that causes generation of an invitation for the user to contact a call center or a chat support may be generated. According to the same example, the alert may also be associated with a relatively high priority score. A priority score may be a number from "1" to "5" indicating which alert should be executed first, where, for example, an alert that is associated with a priority score of "1" should be executed after an alert that is associated with a priority score of "4".

As another example, when the user experience score crosses a predetermined threshold value after a new user was unable to add a first item to the electronic shopping cart, an alert may be sent to the website owner. According to the same example, the alert may also be associated with a relatively low priority score. According to another non-limiting example, when the user experience score crosses a predetermined threshold value after a new user was unable to click the "menu" button, an alert may be sent to the website owner. According to the same example, the alert may also be associated with a relatively low priority score.

Figure 2:
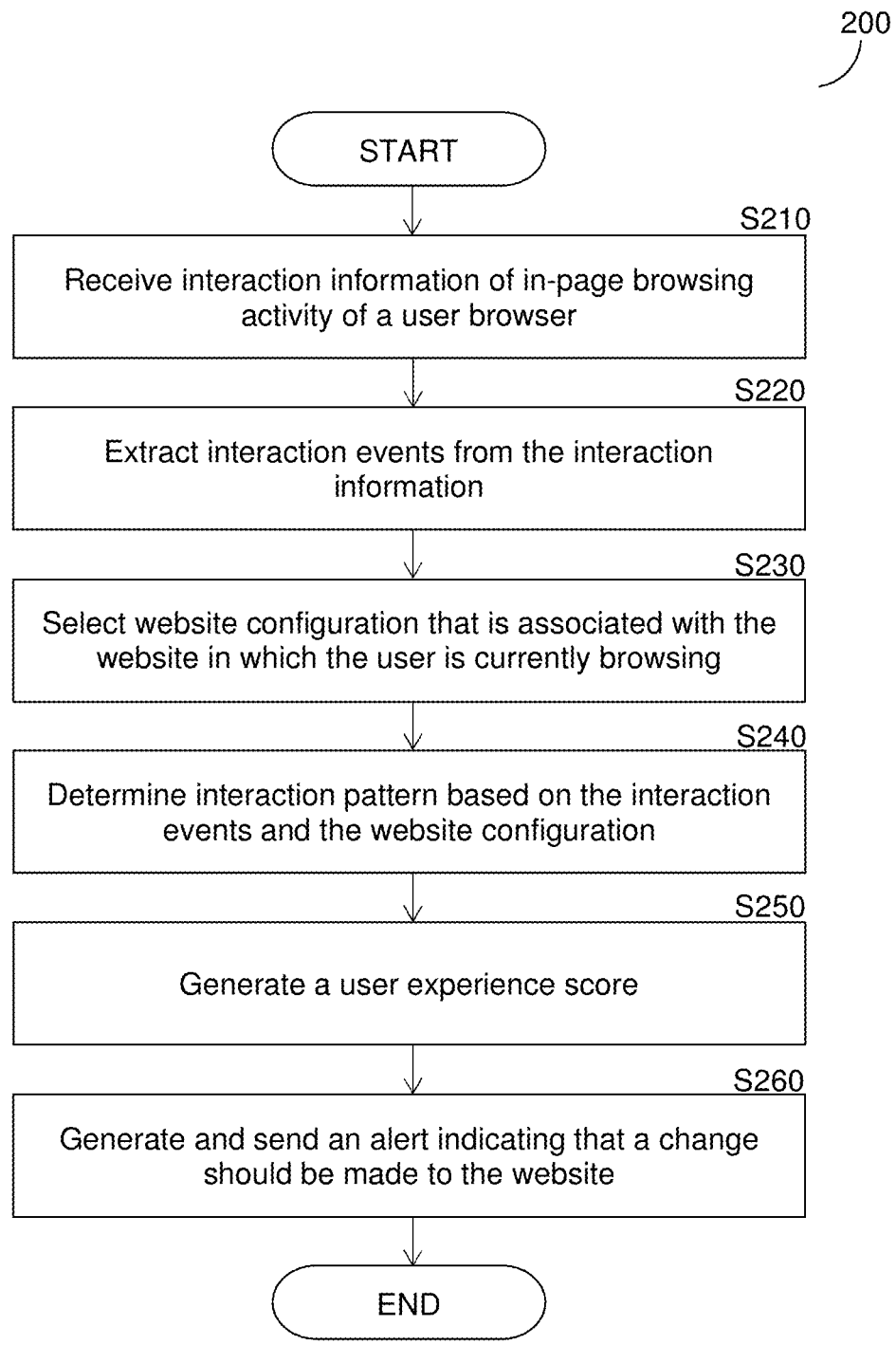
FIG. 2 is a flowchart illustrating a method for communicating negative user experiences of users interacting with a website, according to one embodiment.

FIG. 2 shows an example flowchart 200 illustrating a method for communicating negative user experiences of users interacting with a website. In an embodiment, the method is performed by the analytic sever 130.

At S210, interaction information of in-page browsing activity of a user browser is received. As further discussed herein, the interaction information of the in-page browsing activity may include a mouse movement, scrolling of web page, resizing of browser window, click events, keyboard use with any element of a webpage, and the like. The interaction information may further include URL, referrer, load time, IP address, browser type, screen resolution, page views, and the like.

At S220, interaction events are extracted from the interaction information. An interaction event may be for example, a hover with the mouse cursor over an element (e.g., a virtual button, a link), a click on an element, a tap on an element (e.g., tapping on a specific virtual button), and the like. That is, not every interaction of the user with the website webpage is considered an event.

At S230, one or more zones in the webpage being analyzed are detected or otherwise retrieved from website configuration associated with the website selected. The website configuration may indicate different zones of each web page of the website, and a uniform resource locator (URL) of each web page of the website. The selection of the website configuration may be achieved based on at least a portion of the interaction information indicating at a URL of a web page in which the user is currently browsing. In an embodiment, the detection of zones in a webpage is performed by analyzing the DOM structure and elements and further discussed in the above-referenced '190 Application.

At S240, interaction patterns are determined based on the extracted events and the zones of the webpage. This is performed in part to determine which zones have been accessed and the events performed on the zones. For example, a user's clicks on a product image would be considered as an interaction pattern, wherein the "click" is an event and the "image" is a zone.

At S250, a user experience score representing the interaction pattern is computed. The user experience score is computed in real-time based on the interaction patterns. In an embodiment, a user experience score is computed for each identified interaction pattern. It should be noted that the user experience score may be constantly updated. The process for computing the user experience score and determining its sentiment (positive or negative) is further discussed in FIG. 3.

At S260, an alert indicating an identified interaction pattern demonstrating a negative user experience is generated. The alerts may further indicate that changes should be made to the website to improve the user experience. This step is further discussed with respect to FIG. 4. It should be noted that the alert and, thus, any changes, can be reported and implemented in near real time, that is, upon identifying an interaction pattern demonstrating a negative user experience.

Figure 3:
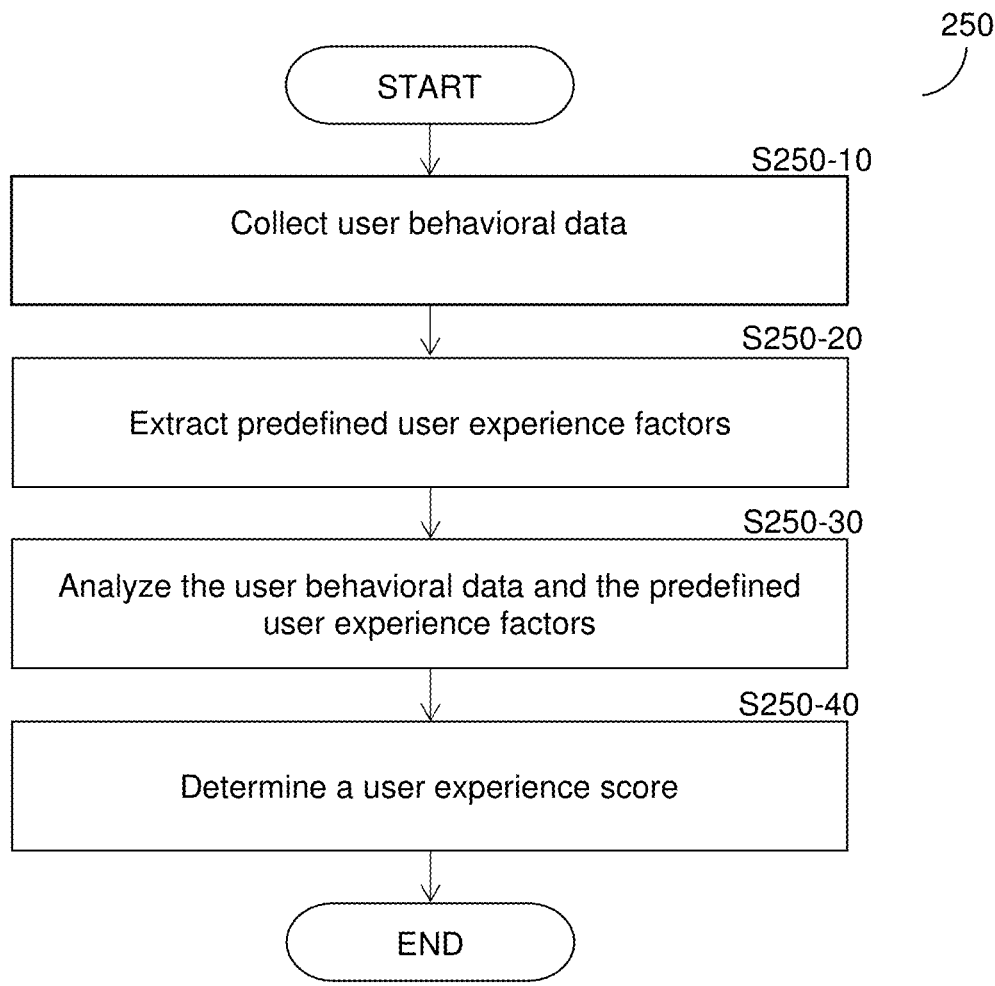
FIG. 3 is a flowchart illustrating a method for computing a user experience score, according to one embodiment.

FIG. 3 shows an example flowchart S250 illustrating a method for computing a user experience score, according to one embodiment. In an embodiment the method is performed by the analytic sever 130.

At S250-10 behavioral data is collected. The user behavioral data may be collected in real-time or near real-time and may be indicative of actions made by the user while browsing through a website. In an embodiment, user behavioral data may be determined based on one or more interaction events that occur while the user browses through the website.

At S250-20, predefined user experience factors are extracted. User experience factors are predefined interactions which indicate a user's difficulty or ease in operating or navigating a webpage or site. That is, the predefined user experience factors may be indicative of a negative or positive interaction of a user with a website, as further described hereinabove with respect to FIG. 1.

At S250-30, the user behavioral data and the predefined user experience factors are analyzed.

At S250-40, a user experience score is determined. The user experience score provides an indication of the user experience in real-time or near real-time while the user is browsing through the website.

Figure 4:
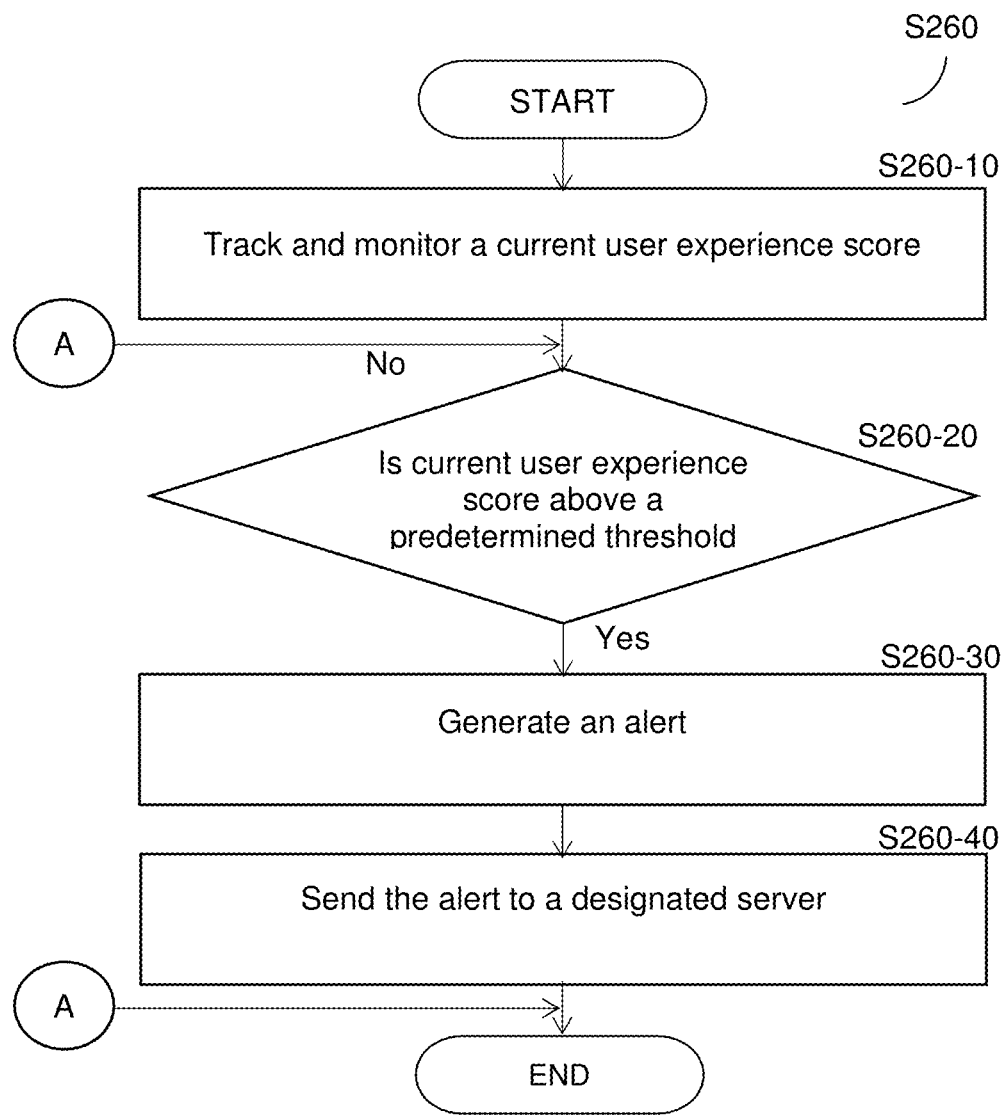
FIG. 4 is a flowchart illustrating a method for generating alerts with respect to interaction patterns of a user in an online retail platform, according to one embodiment.

FIG. 4 shows an example flowchart S260 illustrating a method for generating alerts with respect to interaction patterns of a user in a website according to one embodiment. In an embodiment, the method is performed by the analytic sever 130.

At S260-10, a current user experience score (that is constantly generated and updated in near real-time) is constantly tracked and monitored. As noted herein above, user experience scores represent the user interaction pattern while browsing through a particular website. The user experience score is computed in real-time based on the user behavior and friction patterns the user has experienced. The user experience score may be determined based on one or more interaction events that occur while the user browses through the website. When analyzed, each interaction event may be indicative of the URL of a web page or web pages in which interaction event (or events) occurred, the web page zone or zones in which the interaction event (or events)

occurred, the interaction event type, a time pointer at which each interaction event occurred, and so on. It should be noted that the user experience score may be constantly updated.

At S260-20, it is checked whether the current user experience score is above a predetermined threshold value and if so, execution continues with S260-30; otherwise, upon determination that the user experience score value is below the predetermined threshold value, execution ends, and no alert is generated. The predetermined threshold value may be a number that is used for distinguishing between cases in which the user experience is positive and cases in which the user experience is negative. Thus, when the user experience score is determined to be relatively high (i.e., above the predetermined threshold value) it means that the user encountered some issues while browsing through the website. That is, in this example, a high user experience score means a negative user experience.

At S260-30, an alert is generated to notify the website owner that a user is experiencing one or more difficulties. The alert may indicate the URL of a web page or web pages in which interaction event (or events) occurred, the webpage's zone or zones in which the interaction event (or events) occurred, the interaction event type, a time pointer at which each interaction event occurred, and the like.

At S260-40, the alert is sent over a network (e.g., the network 140 of FIG. 1) to, for example, a predefined server that is associated with the owner of the tracked website (e.g., the website owner server 160). It should be noted that the alert may be sent in near-real-time (e.g., within milliseconds) from the when the current user experience score is determined to be above the predetermined threshold value. Thus, and as further discussed hereinabove, a predefined server to which the alert was sent may execute one or more actions to solve the issues or problems the user has encountered.

In an embodiment, the alert may be sent to, for example, the abovementioned predefined server using an application programming interface (API). In some embodiment, in response to generating the alert, a modified code (HTML) code is generated and sent to the server hosting the website. The modified code is provided to improve a webpage in which a negative user experience has been encountered. For example, the code may fix an issue with an "unclickable" image. Thus, when the modified code is downloaded to a browser, a user will be able to click the image, so that an action would be triggered.

It should be noted that an alert may include any form of an electronic notification, such as, a message, a report, and the like. The electronic notification may be communicated in a form of an email, a pop-up widow, a signal, a text message, and the like.

Figure 5:
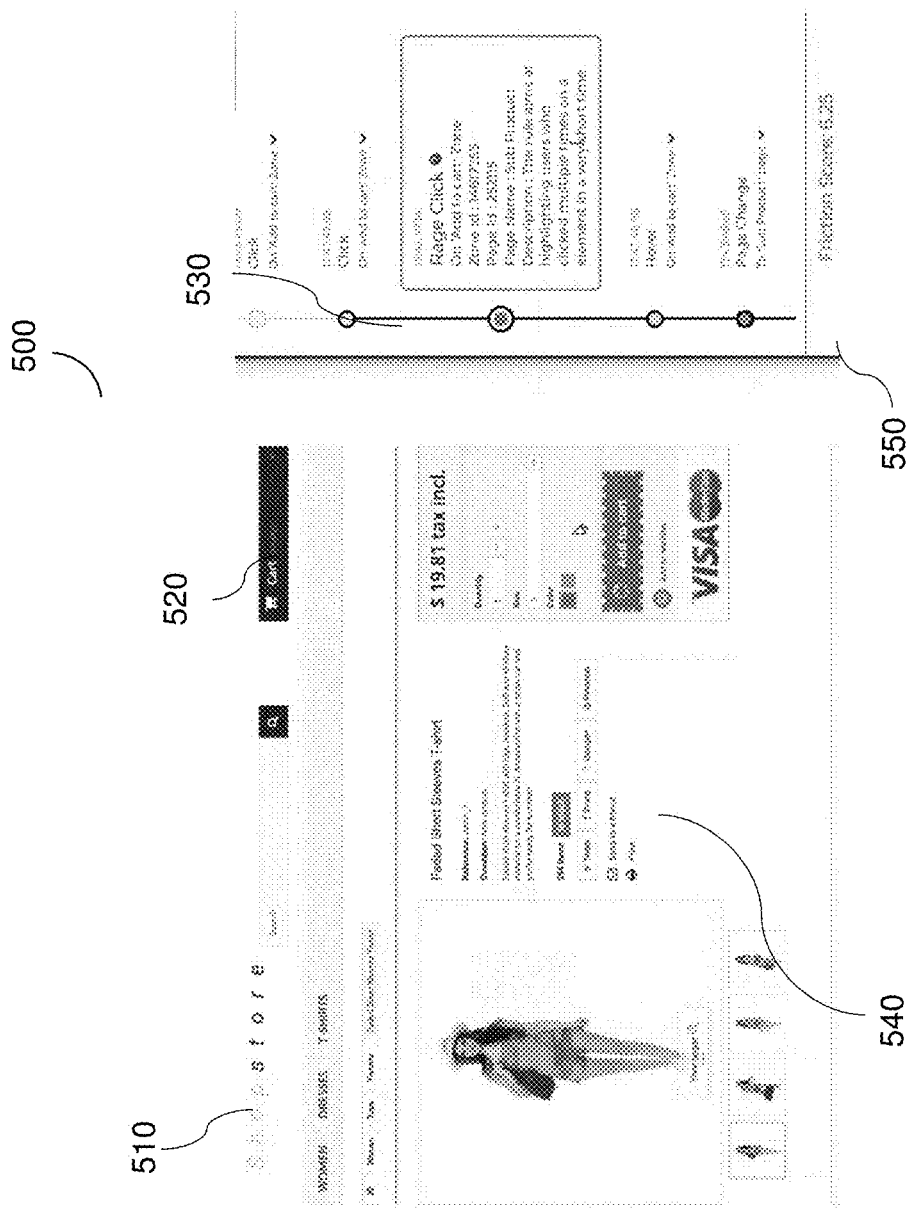
FIG. 5 shows a screenshot of an example web page and an example dashboard displaying the results of the method according to an embodiment.

FIG. 5 shows an example screenshot 500 of an example webpage and an example dashboard displaying the results of the method according to an embodiment. The screenshot 500 includes an image 510 of the web page that is being analyzed. A list 520 of all interaction information and interaction events is presented. An interaction event 530 indicates that the "add to cart" virtual button 540 was clicked multiple times in a short time. A user experience score 550 indicates the user behavior and user experience factors the user has experienced. As noted above, the user experience factors may be determined based on one or more interaction events that occur while the user browses through the website.

Figure 6:
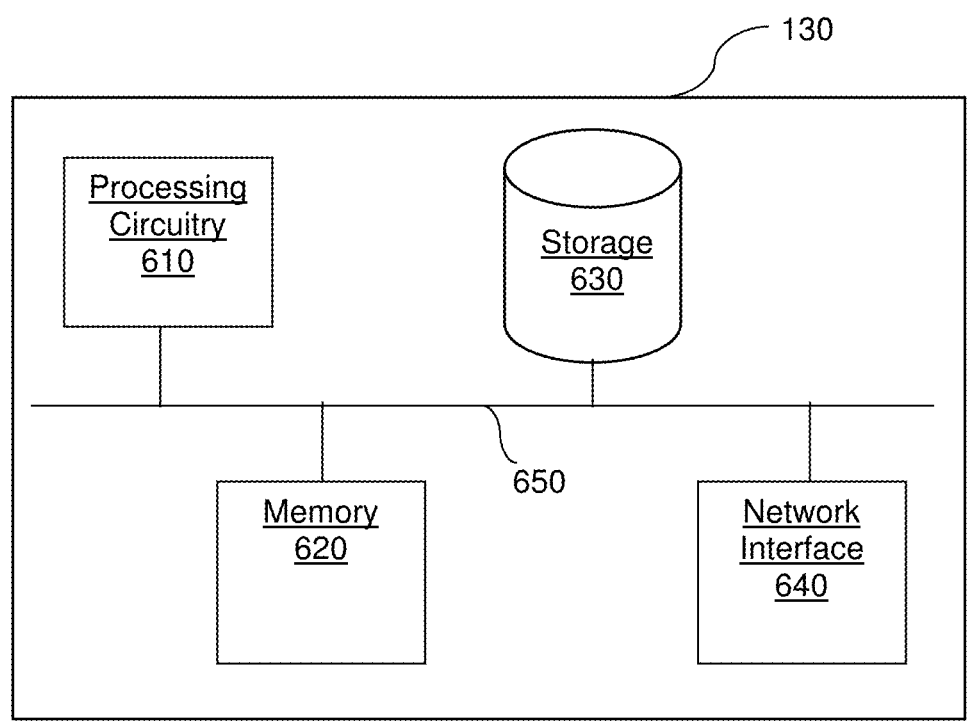
FIG. 6 is a block diagram of an analytic server utilized to process and analyze interaction information of browsing activity according to an embodiment.

FIG. 6 is an example block diagram of the analytic sever 130 designed according to an embodiment. The analytic sever 130 includes a processing circuitry 610 coupled to a memory 620, a storage 630, and a network interface 640. In an embodiment, the components of the analytic sever 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

In an embodiment, the server 130, by means of the circuity 610, and the instructions can perform a process for near-real-time communication of negative user experiences of users interacting with a website. To this end, the server 130 is configured to identify at least one interaction pattern by analyzing an in-page interaction information of a user interacting with at least one page of the website, to compute a user experience score for each of the at least one identified interaction pattern, to generate an alert indicating that the user experience score determined for a respective identified interaction pattern demonstrates a negative user experience, and to send the alert immediately upon identifying the interaction pattern demonstrating a negative user experience. The server 130 is further configured to send the alert to a predefined server, where the alert indicates at least the identified interaction pattern demonstrating the negative user experience and a webpage where the interaction pattern is identified.

The server 130 is further configured to generate a piece of code for fixing the webpage where the interaction pattern is identified and to send the piece of code to a web server hosting the website, thereby improving the user experience for subsequent visits to the webpage.

The server 130 is further configured to receive browsing activity gathered from user devices visiting the website, where the browsing activity includes at least interaction information of a user with at least one webpage of the website and extracting interaction events from received interaction information.

The server 130 is further configured to analyze the in-page interaction information by detecting at least one zone included in a webpage being analyzed and identifying the at least one interaction pattern based on the at least one detected zone and the extracted events.

The server 130 is further configured to compare the user experience score to a predefined threshold and to analyze the interaction pattern to demonstrate a negative user experience, when the score is above the predefined threshold. The server 130 is further configured to compute a user experience score by determining, based on the interaction information, a set of user experience factors and computing the user experience score based on the set of user experience factors.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the analytic sever 130 to communicate with the various components, devices, and systems described herein for near-real-time communicating negative user experience of users interacting with a website.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

What is claimed is:

1. A method comprising:
   identifying, by a processor, a plurality of interaction patterns based on analyzing interaction information of a user interacting with at least one page of a website displayed by a first client device, wherein the first client device is associated with the user;
   generating a plurality of user experience scores for the plurality of interaction patterns;
   generating a plurality of alerts indicating a negative user experience associated with the plurality of interactive interaction patterns based on the plurality of user experience scores, wherein each alert in the plurality of alerts includes a uniform resource locator (URL) of the at least one page of the website in which the plurality of interaction patterns occurred, one or more webpage zones of the at least one page of the website in which the plurality of interaction patterns occurred, one or more types associated with the plurality of interaction patterns, and one or more time pointers associated with the plurality of interaction patterns;
   assigning a plurality of priorities to the plurality of alerts based on the interaction information of the user interacting with the at least one page of the website and historical data of the user associated with the at least one page of the website; and
   based on the priorities of the plurality of alerts and the plurality of user experience scores, causing executable computer code to automatically execute on the first client device.

2. The method of claim 1, further comprising:
   sending the plurality of alerts to a server, wherein the plurality of alerts comprise the negative user experience, the plurality of interaction patterns associated with the negative user experience, and the at least one page of the website.

3. The method of claim 1, further comprising:
   causing the plurality of alerts to be in an order based on a priority of each of the plurality of alerts; and
   causing to be displayed by the first client device on the at least one page of the website, a message to the user comprising information on the negative user experience.

4. The method of claim 3, wherein the message includes a suggestion to assist the user with a specific problem the user has encountered.

5. The method of claim 3, wherein the message comprises an instruction causing an alteration of an operation of the website for the user.

6. The method of claim 1, further comprising:
   receiving browsing activity from user devices visiting the website, wherein the browsing activity comprises the interaction information of the user with the at least one page of the website.

7. The method of claim 6, further comprising:
   extracting interaction events from the interaction information.

8. The method of claim 7, wherein analyzing the interaction information further comprises:
   detecting a zone in the at least one page of the website; and
   identifying the plurality of interaction patterns based on the detected zone and the interaction events.

9. The method of claim 1, further comprising:
   comparing the plurality of user experience scores to a predefined threshold; and
   determining the plurality of interaction patterns based on the comparison of the plurality of user experience scores to the predefined threshold.

10. The method of claim 1, wherein computing the plurality of user experience scores further comprises: determining a set of user experience factors, based on the interaction information; and computing the plurality of user experience scores based on the set of user experience factors.

11. A system for near-real-time communicating negative user experience of users interacting with a website, comprising:
a processing circuitry; and
a memory, the memory containing instructions that, when executed by the processing circuitry, configure the system to perform operations comprising:
identifying a plurality of interaction patterns based on analyzing interaction information of a user interacting with at least one page of a website displayed by a first client device, wherein the first client device is associated with the user;
generating a plurality of user experience scores for the plurality of interaction patterns;
generating a plurality of alerts indicating a negative user experience associated with the plurality of interactive interaction patterns based on the plurality of user experience scores, wherein each alert in the plurality of alerts includes a uniform resource locator (URL) of the at least one page of the website in which the plurality of interaction patterns occurred, one or more webpage zones of the at least one page of the website in which the plurality of interaction patterns occurred, one or more types associated with the plurality of interaction patterns, and one or more time pointers associated with the plurality of interaction patterns;
assigning a plurality of priorities to the plurality of alerts based on the interaction information of the user interacting with the at least one page of the website and historical data of the user associated with the at least one page of the website; and
based on the priorities of the plurality of alerts and the plurality of user experience scores, causing executable computer code to automatically execute on the first client device.

12. The system of claim 11, wherein the operations further comprise:
sending the plurality of alerts to a server, wherein the plurality of alerts comprise the negative user experience, the plurality of interaction patterns associated with the negative user experience, and the at least one page of the website.

13. The system of claim 11, wherein the operations further comprise:
causing the plurality of alerts to be in an order based on a priority of each of the plurality of alerts; and
causing to be displayed by the first client device on the at least one page of the website, a message to the user comprising information on the negative user experience.

14. The system of claim 11, wherein the operations further comprise:
receiving browsing activity from user devices visiting the website, wherein the browsing activity comprises the interaction information of the user with the at least one page of the website.

15. The system of claim 14, wherein the operations further comprise:
extracting interaction events from the interaction information.

16. The system of claim 15, wherein the operations further comprise:
detecting a zone in the at least one page of the website; and
identifying the interaction patterns based on the detected zone and the interaction events.

17. The system of claim 11, wherein the operations further comprise:
comparing the plurality user experience scores to a predefined threshold; and
determining the plurality of interaction patterns based on the comparison of the plurality of user experience scores to the predefined threshold.

18. The system of claim 11, wherein the operations further comprise
determining a set of user experience factors based on the interaction information; and
computing the plurality of user experience scores based on the set of user experience factors.

19. The system of claim 11, wherein the website is an e-commerce website.

20. A non-transitory computer readable medium having stored thereon instructions for causing a processing circuitry to execute a process for communicating negative user experience, the process comprising:
identifying a plurality of interaction patterns based on analyzing interaction information of a user interacting with at least one page of a website displayed by a first client device, wherein the first client device is associated with the user;
generating a plurality of user experience scores for the plurality of interaction patterns;
generating a plurality of alerts indicating a negative user experience associated with the plurality of interaction patterns based on the plurality of user experience scores, wherein each alert in the plurality of alerts includes a uniform resource locator (URL) of the at least one page of the website in which the plurality of interaction patterns occurred, one or more webpage zones of the at least one page of the website in which the plurality of interaction patterns occurred, one or more types associated with the plurality of interaction patterns, and one or more time pointers associated with the plurality of interaction patterns;
assigning a plurality of priorities to the plurality of alerts based on the interaction information of the user interacting with the at least one page of the website and historical data of the user associated with the at least one page of the website;
and
based on the priorities of the plurality of alerts and the plurality of user experience scores, causing executable computer code to automatically execute on the first client device.

* * * * *

UNITED STATES PATENT AND TRADEMARK OFFICE
CERTIFICATE OF CORRECTION

PATENT NO. : 11,799,746 B2
APPLICATION NO. : 16/937938
DATED : October 24, 2023
INVENTOR(S) : Zenine et al.

Page 1 of 1

It is certified that error appears in the above-identified patent and that said Letters Patent is hereby corrected as shown below:

In the Claims

In Column 12, Line 63, in Claim 10, after "comprises:", insert a linebreak

In Column 12, Line 65, in Claim 10, after "and", insert a linebreak

In Column 14, Line 17, in Claim 18, after "comprise", insert --:--

In Column 14, Lines 52-53, in Claim 20, delete "website; and" and insert -- website; and -- therefor Signed and Sealed this
Twenty-eighth Day of January, 2025

Coke Morgan Stewart
*Acting Director of the United States Patent and Trademark Office*